United States Patent [19]
Whitlock

[11] 4,175,468
[45] Nov. 27, 1979

[54] METHOD AND APPARATUS FOR MUSIC INSTRUCTION

[76] Inventor: Robert R. Whitlock, 7138 Hanover Pkwy., Greenbelt, Md. 20770

[21] Appl. No.: 734,885

[22] Filed: Oct. 22, 1976

[51] Int. Cl.² ............................................. G10G 1/02
[52] U.S. Cl. ................................. 84/485 SR; 84/473
[58] Field of Search ................... 84/471 SR, 473, 474, 84/480, 485 SR

[56] References Cited

U.S. PATENT DOCUMENTS

| | | | |
|---|---|---|---|
| 3,668,967 | 6/1972 | Malis | 84/471 SR |
| 3,712,167 | 1/1973 | Renault | 84/485 SR |
| 3,748,947 | 7/1973 | Freiheit | 84/471 SR |
| 3,758,698 | 9/1973 | Matyas | 84/485 SR |

FOREIGN PATENT DOCUMENTS 1512399  2/1968  France .................................. 84/485 SR

*Primary Examiner*—Lawrence R. Franklin

[57] ABSTRACT

Method and apparatus for indicating finger pattern information for a musical stringed fingerboard instrument comprising at least one type of first indicia in a fingering pattern specified by pairs of coordinates representing allowable locations for fingering the stringed fingerboard instrument to sound musical tones of a chord or scale, and a repositionable string stop series for selecting a correlation of the ordinal number of at least one string stop of the stringed fingerboard instrument with the indicia of the fingering pattern.

6 Claims, 16 Drawing Figures

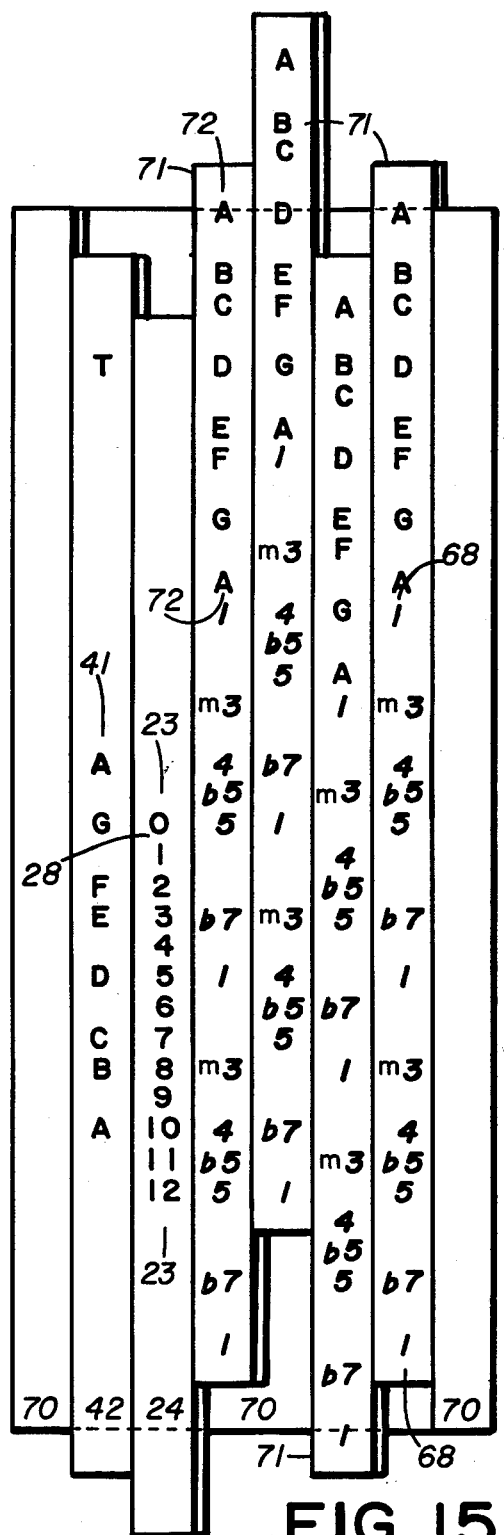
FIG. 15
FIG. 16
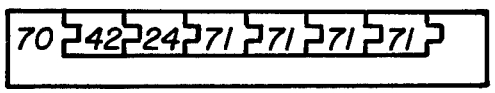

METHOD AND APPARATUS FOR MUSIC INSTRUCTION

FIELD OF THE INVENTION

This invention lies in the field of indicators of finger pattern information for playing stringed fingerboard musical instruments.

PRIOR ART

Several aids are already available for teaching finger positions of stringed fingerboard instruments. Chord manuals and instruction books remain the most common teaching aids for chords and scales. These aids are very helpful in that they provide beginning students with instruction as to the easiest of the customary finger assignments and hand positions. However, when manuals attempt to present a broad selection of chord fingerings, they become very lengthy, perhaps to the point of giving the appearance that playing musical instruments is more complicated than it really is. Chord manuals are dedicated to a single instrument at a time, thus failing to point out the simplifying similarities between the various instruments which could encourage the student to broaden his instrument repertoire with little additional learning effort. Rarely is any mention made of chord diagrams or scale patterns for tunings other than the standard tuning for the instrument.

The chord constructor approach has the potential versatility to accommodate the needs unsatisfied by manuals and books. Some progress has been made in this area; for example, many chord constructors derive an increased ability to display finger pattern information by completely ignoring finger assignment information. This trade-off can be easily accepted by students of even very modest ability. Nonetheless, there remain other needs to which chord constructors have not adequately addressed themselves.

Chord constructors have been disclosed for Tenor Banjo and Guitar in standard tuning. Previous devices have pointed out the relevance of chord constructors to other stringed instruments, but there has been insufficient emphasis on the value of a single device for indicating chords or scales for more than one instrument. Also, nonstandard tunings, their interrelationships and unifying principles have received insufficient treatment from both the manuals and the previous chord constructors. Nonstandard tunings are indeed of considerable contemporary interest, and the recognition of unifying concepts in this area can help to preclude a recurrence of the confusion about tunings which was contributory to the demise of the popularity of the Lute in the 17th century. A teaching aid addressed to this direction is needed at this time.

Constructors have generally been subservient to the widespread interest in chord playing; however, a single note technique relying on scales is also of fundamental importance to an overall musical ability. Indeed, there are many stringed fingerboard instruments for which scales are of greater significance than chords. There are numerous scales which find utility in instrumental work, and the music field would benefit from an enrichment in teaching aids for their instruction. As with chords, scales have received little attention for nonstandard tunings.

There are several instruments with special features which have not been served by previous chord constructors. For instance, the fifth string of a Five String Banjo is shorter than the other four strings; its role as a mere drone string is no longer universally accepted. The matter here is complicated by the extant variety in Banjo neck lengths. Various instruments, such as the fretted Dulcimer, have fret spacings which do not correspond to the chromatic scale. These special features deserve to be recognized and treated by an apparatus for presenting chord and scale finger pattern information.

With any teaching aid, there is a need for both diversity and simplicity. The embodiments of existing indicating devices have exhibited only limited diversity in presenting individual chords and scales in a variety of tunings and for several quantities of strings.

The simplicity of such an indicating apparatus should be optimized in its structure and in its display. The excessive use of overlays or windows may require that portions of the display remain hidden from the student's view, giving an unnecessary impression of inherent complexity. Furthermore, the inclusion of superfluous or invariant information is a detraction from the simplicity of the chord or scale display. For instance, the correspondence between scale degrees and notes names of a given key is an invariant which never changes, regardless of the chord type, the instrument, or the tuning. This invariant information is often better suited to tabulation on paper than to inclusion as an integral part of chord or scale displays, generated by an apparatus.

OBJECTS

It is therefore an object of this invention to provide a method and apparatus for indicating chord and scale finger pattern information of any chord or scale in any tuning of essentially any fretted or nonfretted stringed fingerboard instrument with any reasonable number of strings.

Another object is to provide an apparatus which is easily and inexpensively constructed, durable, with few moving parts, but nonetheless with great diversity of application.

A further object is to provide a method and apparatus for indicating finger pattern information for any chord or scale to a plurality of root or tonic notes for a plurality of instruments tuned to the same musical intervals, whether the instruments are tuned to the same absolute pitches or not.

Still another object is to provide a method and apparatus by which tunings are presented in such manner as to allow amalgamation of several instrument tunings into a single visual display, whereby the desired information is economically condensed and yet is easily accessable.

Yet another object is to provide an apparatus for indicating finger pattern information which, in its simplicity of construction, does not rely on perforations or peep-holes to perform its most basic functions.

Beyond the foregoing, a further object is to provide a method and apparatus for indicating a finger pattern displaying the scale degrees in the makeup of a chord or scale, whereby the musician is not burdened by additional mental computation of sharps or flats and whereby the beginner, whose knowledge of chord and scale makeup is scant, can successfully choose from the display one of each type of scale degree symbol for the makeup of the fingering to be played.

A still further object is to provide an apparatus for indicating finger pattern information for instruments which have strings of differing length, such as the Five String Banjo.

Another object is to provide an apparatus for indicating finger pattern information applicable to stringed instruments which have chromatic frets spaced further apart than a chromatic half-step.

SUMMARY

In accordance with one aspect of the invention, these and other objects are achieved by a method and apparatus for indicating finger pattern information for a musical stringed fingerboard instrument comprising at least one type of first indicia in a fingering pattern specified by pairs of coordinates representing allowable locations for fingering the stringed fingerboard instrument to sound musical tones of a chord or scale, and a repositionable string stop series for selecting a correlation of the ordinal number of at least one string stop of the stringed fingerboard instrument with the indicia of the fingering pattern.

Other objects and advantages of the invention will be apparent from the following specification and the accompanying drawings which are for the purpose of illustration only.

BRIEF DESCRIPTION OF DRAWINGS

FIG. 15 is a plan view of an apparatus for composing fingering patterns, including a plurality of alignably repositionable fingering series and other features.

FIG. 16 is an end view of the apparatus of FIG. 15.

DETAILED DESCRIPTION OF DRAWINGS

The detailed description of the drawings will be facilitated by an initial description of fingering patterns. Fingering patterns have a first dimension (arbitrarily shown hereinafter to be the horizontal or X dimension) along which coordinates, hereinafter referred to as course coordinates, represent courses of a stringed fingerboard instrument and a second dimension (arbitrarily shown hereinafter to be the vertical or Y dimension) along which coordinates, hereinafter referred to as string stop coordinates, represent string stops. Going from the fingerboard of the instrument to the fingering pattern of the apparatus, a mapping is followed according to which ordinal numbers of the string stops and ordinal numbers of the courses at which the stringed fingerboard instrument may be fingered to sound particular tones are mapped into the string stop coordinates and course coordinates of indicia of the fingering pattern. When the particular tones are the tones of a chord or scale, the coordinates of the indicia of the fingering pattern form a mapping image, under the mapping, of allowable locations for fingering the stringed fingerboard instrument to sound musical tones of a chord or scale.

A course, in the context of stringed fingerboard instruments, is a string or a plurality of strings fingered as a unit and strung adjacent to one another, such as the double stringed courses of the Mandolin and the Twelve String Guitar.

To "stop" a string of a fretted or nonfretted stringed fingerboard instrument refers, in my usage, to fixing or altering the total vibrational length of the string, thus fixing or altering the pitch of the tone which the string sounds. A string stop is a location on the stringed fingerboard instrument where the string is (or may be) thus stopped, generally so as to produce a tone in the chromatic scale. For stringed fingerboard instruments having a single nut, the nut will hereinafter be referred to as zeroth string stop.

The term "musical interval" generally is used to include a spacing of musical tonality together with a direction of increasing or decreasing pitch; the term is therefore a vector quantity. The term "musical intervallic magnitude" refers solely to the spacing of musical tonality, without of itself specifying a direction (scalar quantity).

Figure 1:
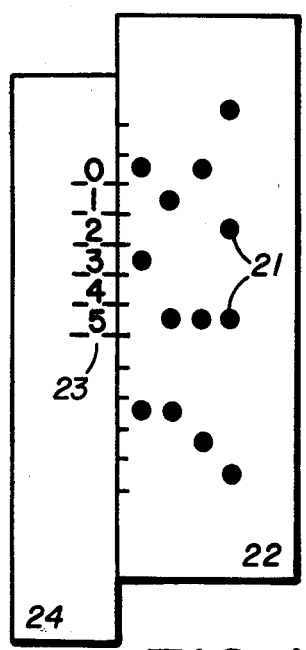
FIG. 1 is a plan view of an apparatus comprising a fingering pattern in alignment with a string stop series, thereby indicating a fingerboard pattern for the placement of the fingers to play the major chord (to the root G, not indicated) in a variety of positions for the Venezuelan Cuatro, tuned to the notes B,F#,D,A.

Referring now to the drawings, FIG. 1 shows by way of example a finger pattern indicator in accordance with the invention. According to the embodiment, the indicator comprises a fingering pattern (21) of first indicia, shown in FIG. 1 to be black dots, on a base (22) and a string stop selector. The fingering pattern (21) in FIG. 1 spans a range of four course coordinates (shown in the drawings as columns of indicia) and thirteen string stop coordinates (rows of indicia), although indicia are located at only nine of the thirteen string stop coordinates. The string stop selector comprises a series of at least one second indicia, hereinafter referred to as string stop series (23), on a base (24). The fingering pattern and the string stop series are substantially adjacent and alignably repositionable with respect to each other. Various fingering patterns, such as for different chords or scales, may be printed on various bases and interchanged by removing the present fingering pattern and replacing it with a new fingering pattern on another base.

The indicia of the string stop series (23) indicate ordinal numbers of the string stops of a stringed fingerboard instrument and have spacings which represent musical intervallic magnitudes characteristically used in stopping the strings of a stringed fingerboard instrument, such as the fretting intervals of a fretted instrument. The spacings are of such size that repositioning the string stop series (23) and the fingering pattern (21) with respect to each other in substantially the vertical direction brings indicia of the string stop series (23) into alignment with string stop coordinates of the fingering pattern (21). There is a plurality of positionings in which this alignment takes place. The musical intervals of string stops represented by the aligned coordinates of the fingering pattern (21) are the same as the musical intervals of string stops represented by the thereto aligned indicia of the string stop series (23). The string stop series and the fingering pattern need not be but are allowed to be, in the same or in parallel planes.

The fingering pattern (21) does not indicate a unique correlation between string stop coordinates of the fingering pattern (21) and string stops of the stringed fingerboard instrument. A particular string stop coordinate of the fingering pattern of FIG. 1 is chosen to correlate with a given string stop of the stringed fingerboard instrument (such as the zeroth string stop) by bringing the indicia of the string stop series (23) representing the given string stop (an indicium zero) into alignment with the particular string stop coordinate. A fingering pattern for which such a correlation has been made is hereinafter referred to as a fingerboard pattern. The fingerboard pattern, the thusly aligned indicia of the string stop series (23), the thereto aligned string stop coordinates of the fingering pattern (21), and the string stops so correlated are hereinafter described as selected.

When a correlation is established between only one string stop of the stringed fingerboard instrument and one string stop coordinate of the fingering pattern, then the correlation for remaining string stops is uniquely determined for an instrument having a given set of string stopping intervals: the ordinal numbering of other string stops proceeds according to the convention that string stop ordinal numbers increase as the total vibrational string length decreases. Thus, the selection of one string stop determines the selection of a plurality of string stops.

In FIG. 1, indicia of the string stop series (23) align with string stop coordinates of the fingering pattern (21) and the correlation is thus determined and indicated for string stops zero through five. Following again this same proceedure, alignably repositioning the string stop series (23) with respect to the fingering pattern (21) along substantially the vertical dimension comprises a new string stop selection and establishes a new correlation, i.e., a new fingerboard pattern.

The assignment of a correspondence of course coordinates of the fingering pattern with course numbers of the stringed fingerboard instrument proceeds by visual inspection. For instance, in FIG. 1, the first (highest pitch) course of the stringed fingerboard instrument is represented by the rightmost of the course coordinates of the fingering pattern and the fourth (lowest pitch) course by the leftmost, etc. Thus, the rightmost indicia of the fingering pattern fall along the first course of the stringed fingerboard instrument.

In such manner, the fingering pattern (21) and the string stop series (23) operate together in a repositionable and alignable relationship to indicate a fingerboard pattern in accordance with which the stringed fingerboard instrument may be variously fingered to sound tones of a chord or scale.

The apparatus of FIG. 1 indicates a fingerboard pattern for playing a major chord on the Venezuelan Cuatro, a South American instrument similar to a Guitar. The instrument is usually tuned B,F#,D,A from the leftmost to the rightmost strings. In particular, the indicated fingering pattern represents the G major chord: when the musician places his fingers on the fingerboard of the Venezuelan Cuatro at the string stop and course locations indicated by the fingerboard pattern, the tones which are sounded by the vibrating strings are tones of the G major chord. An F major chord may be indicated with this apparatus by alignably repositioning the string stop series vertically downward by a distance which corresponds to the musical interval from the note G to the lower note F.

The note of a chord, such as the note G in a G major chord and the note F in a F major chord, is referred to as the root or root note of the respective chord. Similarily, the note of a scale, such as the note C in a C minor scale and the note A flat in an A flat blues scale, is referred to as the tonic or tonic note of the respective scale. The term "principal note" is hereinafter used to imply root note for chords and tonic note for scales.

Thus, the apparatus of FIG. 1 selects fingerboard patterns for a plurality of principal notes (G major, F major, etc.), although the identity of the principal note is not indicated in that figure. The apparatus of FIG. 2, on the other hand, indicates principal note names as well as fingerboard patterns.

Figure 2:
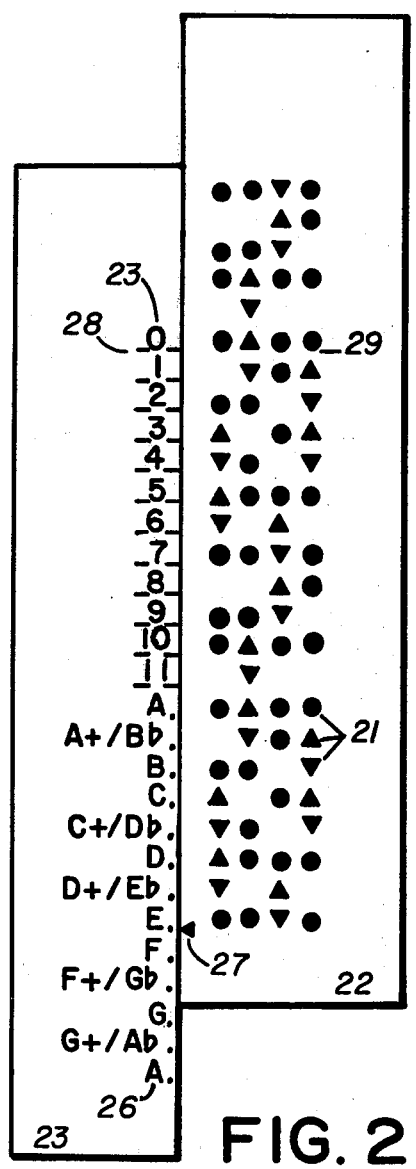
FIG. 2 is a plan view of an apparatus comprising a string stop series in fixed relation to a positive principal note series, alignably positioned with respect to a fingering pattern, indicating a fingerboard pattern for the placement of the fingers to play the ascending and descending melodic minor scale to the tonic note E (as indicated) on a Ukelele, tuned to the notes A,D,F,#,B.

The embodiment of FIG. 2 comprises a fingering pattern (21) on a base (22), a string stop series (23) on a base (25), and a principal note name selector. The principal note name selector comprises a series of third indicia, hereinafter referred to as a positive principal note series (26), shown to be on the base (25) and a positive principal note reference (27), shown to be on the base (22).

The fingering pattern (21) in FIG. 2 indicates a pattern of allowable locations for ascending (inverted triangle), descending (upright triangle), and for both ascending and descending (dot symbol) the melodic minor scale when playing the Ukelele.

The string stop series (23) and fingering pattern (21) of FIG. 2 are substantially adjacent to one another but need not be in the same or in parallel planes. They cooperate to select fingerboard patterns, as heretofore taught by the example of FIG. 1. Any string stop coordinate (29) of the fingering pattern may be selected to correlate with the zeroth string stop of the stringed fingerboard instrument, by bringing the indicium zero (28) of the string stop series (23) into alignment with the desired string stop coordinate (29). A fingerboard pattern is thereby selected. The string stop numbers indicated by the string stop series (23) correlate with the thereto-aligned string stop coordinates of the fingering pattern.

The direction of increasing string stop number, as represented by the string stop series (23), is hereinafter referred to as the positive direction, and the opposite direction as the negative direction.

A principal note name for the fingering pattern is selected by the alignment between indicia of the positive principal note series (26) and the positive principal note reference (27). Selecting a principal note name refers to the making of a musically correct correlation of a principal note name with a fingerboard pattern for playing tones of a chord or scale on a stringed fingerboard instrument in a particular tuning.

The positive principal note series (26) of FIG. 2 represents a chromatic ordering of note names ascending in the positive direction. The positive principal note series (26) and the string stop series (23) are in fixed positional relation with respect to one another, but need not be on the same base or in the same or in parallel planes. The spacings of the indicia of the positive principal note series allow pairs of indicia representing note names to align with pairs of string stop coordinates of the fingering pattern representing pairs of string stops separated by the same musical intervallic magnitudes as the respective pairs of note names.

The positive principal note reference (27), which pertains to a certain tuning, is in fixed positional relation to the fingering pattern (21), although it need not be on the same base, in the same or in parallel planes. A principal note name is selected for a fingerboard pattern by bringing indicia of the positive principal note series (26) into alignment with the positive principal note reference (27); the thus-aligned indicia indicate the selected principal note name, shown to be an E in FIG. 2. Alignably repositioning indicia of the positive principal note series (26) with respect to the positive principal note reference (27) results in an aligned repositioning of indicia of the string stop series (23) with respect to the fingering pattern (21) and effects a change in principal note name selection as well as a corresponding change in fingerboard pattern. (The tuning represented by the positive principal note reference (27) remains unchanged.)

In FIG. 2, a fingerboard pattern for the Ukelele is indicated to the principal note E for the melodic minor scale. The apparatus can accommodate to the musician's desire for an indication of the melodic minor scale to a different principal note. Moving the base (25) downward until the D indicium of the positive principal note series is brought into alignment with the positive principal note reference (27) alters the principal note name from E to D, a musical interval of two chromatic half-tones higher in pitch. The string stop series (23) is therewith also alignably repositioned by a corresponding amount, thus altering the fingerboard pattern. The resulting fingerboard pattern indicates courses and string stop numbers for playing the D melodic minor scale.

A further example will now be disclosed with reference to the fingering pattern (21) and the positive principal note series (26) of FIG. 2. Notice that the portion of the fingering pattern which is in alignment with the indicium zero (28) of the string stop series (23) is like that portion of the fingering pattern (21) which is in alignment with the A indicium of the positive principal note series (26). Thus, ignoring the string stop series or in the lack of it, a particular indicium of the positive principal note series, shown to be the A indicium in this example, can be taken to be a string stop reference such that a string stop coordinate of the fingering pattern is selected by alignment with the string stop reference. In this manner, a fingerboard pattern is selected and the principal note name is indicated as previously taught.

The principal note series of FIG. 2, being in fixed positional relation to the string stop series (23), is positively directed (26). A principal note series which is in fixed positional relation to a fingering pattern is negatively directed, as illustrated by the embodiment of FIG. 3.

Figure 3:
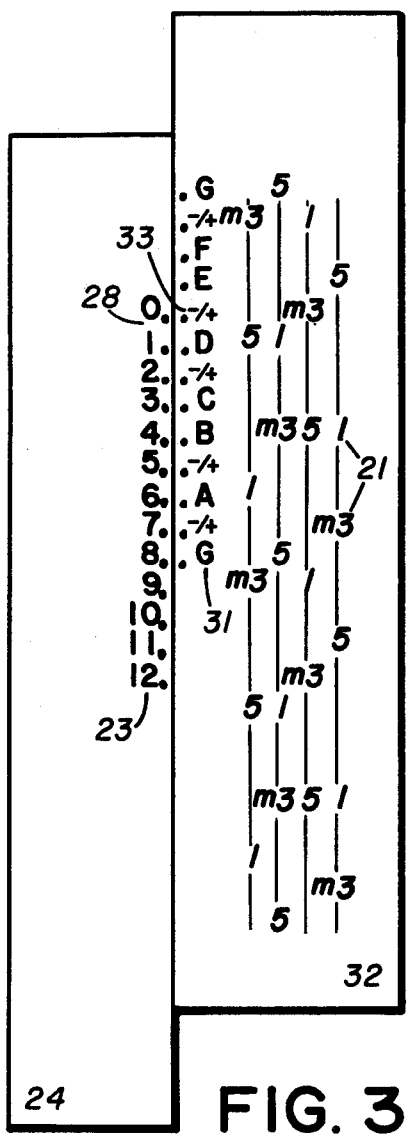
FIG. 3 is a plan view of an apparatus comprising a fingering pattern in fixed relation to a negative principal note series and in alignably repositionable relation to a string stop series, indicating an E flat minor chord fingerboard pattern for the Ukelele, tuned to the notes A,D,F,#,B.

The apparatus of FIG. 3 is shown to have a fingering pattern (21) indicating scale degrees of a particular scale. A string stop series (23) on a base (24) operates in the manner heretofore taught. A principal note name selector in this embodiment comprises a series of fourth indicia, hereinafter referred to as negative principal note series (31), shown to be on a base (32), and a negative principal note reference, shown to be an indicium zero (28) of the string stop series (23).

The coordinates of the indicia of the fingering pattern (21) of FIG. 3 form a mapping image of allowable locations for fingering a stringed fingerboard instrument to sound tones of a given chord or scale (as in previous examples), shown to be the minor chord; the relationships of these tones to degrees of the major scale are symbolized by the respective indicia of the fingering pattern (21). (Scales other than the major scale can be similarly symbolized. The indicated symbols are members of a set of symbols including symbols symbolizing the degrees of the scales.) For instance: a principal note of the major scale is shown as a one and the fifth degree as a five; the indicia shown as m3 symbolize a lowered third degree of the major scale, i.e., a minor third above the principal note.

The string stop series (23) is in alignably repositionable relation to the fingering pattern (21) and cooperates therewith to indicate a fingerboard pattern in the manner heretofore taught.

The negative principal note series (31) of FIG. 3 represents a chromatic ordering of note names ascending in the negative direction. The negative principal note series (31) and the fingering pattern (21) are in fixed positional relation to one another, but need not be on the same base or in the same or in parallel planes. Spacings of the indicia of the negative principal note series (31) allow pairs of (fourth) indicia representing note names to substantially align with pairs of string stop coordinates of the fingering pattern (21) representing pairs of string stops separated by the same musical intervallic magnitudes as the respective pairs of note names.

The negative principal note reference (28), which pertains to a certain tuning of the stringed fingerboard instrument, is in fixed positional relation to the string stop series (23). The negative principal note reference

(28) and the negative principal note series (31) need not be in the same or in parallel planes. A principal note name is selected for a fingerboard pattern by bringing indicia of the negative principal note series (31) into alignment with the negative principal note reference (28); the thus-aligned indicia indicate the selected principal note name, shown to be an E flat (or D#) (33) in FIG. 3. Alignably repositioning indicia of the negative principal note series (31) with respect to the negative principal note reference (28) results in alignment of indicia of the string stop series (23) with respect to the fingering pattern and effects a change in principal note name and a corresponding change in fingerboard pattern. (The tuning represented by the negative principal note reference remains unchanged). The resulting indications give the fingerboard pattern for playing the minor chord on the Ukelele to the new principal note.

It is evident that the chromatic ordering of the note names is of such an elementary nature in music instruction that the representation of some note names by blanks within a principal note series, such as for those notes with sharps and flats, does not limit the content of the information being indicated and may even enhance legibility and clarity; the identity of any omitted note name is easily deduced by reference to nearby indicia which are not supplanted by blanks. For example, the identity of the root note D#(or its harmonic equivalent E flat) is easily deduced by virtue of its position between E natural and D natural.

Figures 4, 5, 6:
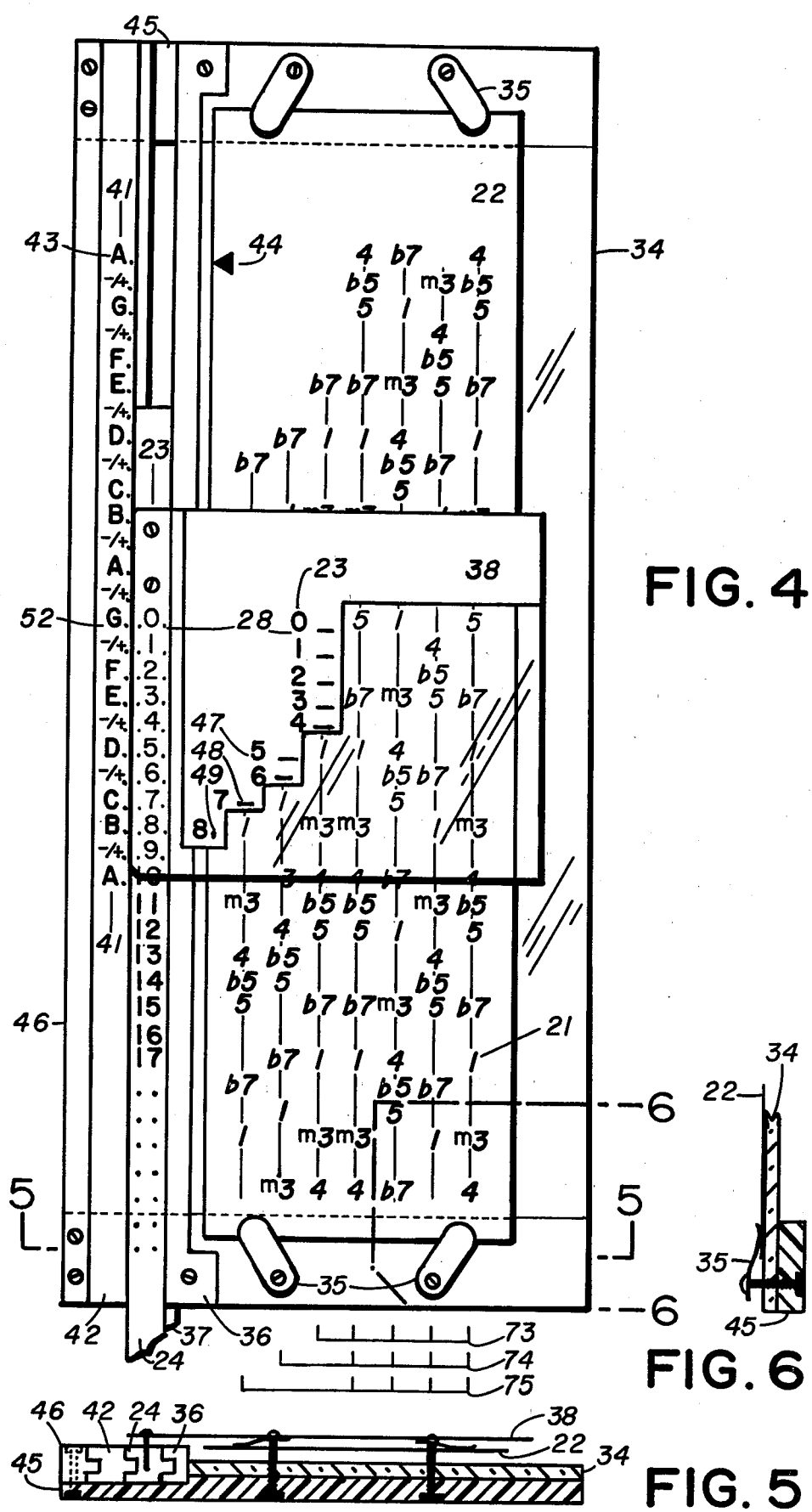
FIG. 4 is a plan view of an apparatus comprising an interchangeable fingering pattern, a repositionable string stop series, a repositionable negative principal note series, and a mask, indicating a fingerboard pattern for Five String Banjos of various neck lengths to sound tones of the G blues scale in the turning G,D,G,B,D, where the indicia of the fingering pattern indicate scale degrees of the major scale.
FIG. 5 is a sectional view of the apparatus of FIG. 4, looking in the direction 5—5.
FIG. 6 is a sectional view of the apparatus of FIG. 4, taken along the direction 6—6.

Thus far, the figures have been interpreted to indicate chord and scale fingerboard patterns which represent allowable locations for fingering stringed fingerboard instruments to sound musical tones of a chord or scale to a variety of principal notes and for a plurality of instruments but to a fixed tuning in each case. Greater flexibility is afforded by the apparatus of FIG. 4, which further enables one to select principal note names for a plurality of congruent tunings. In FIG. 4, a fingering pattern (21) of several types of (first) indicia, further discussed below, operates with a string stop series (23) on a base (24) to indicate a fingerboard pattern in the manner heretofore taught. The fingering pattern (21) and its base (22) are removably affixed to and supported by a support member (34) by fasteners such as clips (35). The support member (34) is rigidly secured along one edge to a grooved sleeve piece (36) which receives the tongue (37) of the base (24) for relative movement between the fingering pattern (21) affixed to support member (34) and the string stop series (23) borne by the base (24). A mask (38) is held in fixed positional relation to the string stop series (23 on the base (24) for which the mask serves as an extention, as will be hereinafter more thoroughly explained. A selector for selecting principal note names and congruent tunings comprises a finite series of fifth indicia hereinafter referred to as negative principal note series (41) on a base (42), a negative principal note reference shown to be an indicium zero (28) of the string stop series (23), a first tuning reference (43) shown to be an A, and a second tuning reference, such as an arrow mark (44) as shown on the base (22). The base (24) is provided with a groove along one edge which receives the tongue of the base (42) for relative movement between the string stop series (23) borne by the base (24) and the negative principal note series (41) borne by the base (42). The indicia of principal note series represent note names. The negative principal note series (41) is not in fixed positional relation to the fingering pattern (21).

A cross sectional view of the apparatus of FIG. 4 is taken along the direction 5-5 and shown in FIG. 5. At each end the support member (34) is affixed a crosspiece (45) to which sleeve pieces (46 and 36) are attached. The sleeve piece (46) has a tongue which is received by a groove in the base (42). The bases (42,24) are thereby secured for relative movement and held between the sleeve pieces (46) and (36). The mask (38) is shown as affixed to the base (24). Both the mask (38) and the base (22) are shown suspended in space merely for the purposes of illustration.

FIG. 6 shows a side view of one of the crosspieces (45), the support member (34) and a fastener (35).

The coordinates of the indicia of the fingering pattern (21) in FIG. 4 form a mapping image of allowable locations for fingering a Five String Banjo to sound tones of the blues scale; the relationships of these tones to degrees of the major scale are symbolized by the respective (first) indicia. For instance: the indicium 1 of the fingering pattern (21) symbolizes a principal note of the major scale; the indicia b7 (flat 7) symbolize a lowered seventh degree. There are, however, more than five courses represented in the fingering pattern of FIG. 4. The first four (rightmost) course coordinates of the Banjo fingering pattern represent the four long (rightmost) strings of a Five String Banjo. The fifth string of such Banjos has a fixed length, whereas the four long strings are of equal but variant length according to the length of the neck of the instrument. The three neck lengths in contemporary use are accounted for in the fingering pattern of FIG. 4; the Banjo player selects from the three leftmost course coordinates of the fingering pattern (21) the one which corresponds to the number of string stops (frets) between the open fourth string and the open fifth string (47,48,49) of his Banjo. For each type of Banjo, the first four course coordinates are used. For a fifth string which is five (47) frets shorter than the fourth string, the fifth course coordinate is used as is schematically indicated (73) in the drawing; for seven (48), the sixth (74) course coordinate is used; and for eight (49), the leftmost course coordinate of the pattern is used (75). Thus, a fingering pattern is used to indicate chord or scale information for instruments having fewer courses than the fingering pattern has course coordinates representing courses, the appropriate course coordinates being obtained by selection.

For the four long strings, the string step series (23) cooperates with the fingering pattern (21) to indicate a fingerboard pattern in the manner heretofore taught. However, because these instruments have two nut string stops, a primary nut for the four long strings and a secondary nut for the fifth string, the musician must consider that as the primary nut string stop is selected by use of the string stop series (23), so the secondary nut string stop must be properly selected in like manner. To accomplish the proper selection of multiple nut string stops, the apparatus of FIG. 4 has a portion of the string stop series (23) on the removable mask (38). The lateral displacement of segments of the string stop series (23) serves to emphasize those indicia (28,47,48,49) of the string stop series (23) which represent the several nuts of the various Five String Banjos. This alleviates the need of mentally reckoning the string stop coordinates of the various nuts. In this fashion, a fingering pattern is used to indicate chord or scale information for a plurality of stringed fingerboard instruments of differing string lengths.

The mask (38) also occludes an unused portion of the fingering pattern (21) above the nut string stops. Even without regard to the string stop series (23,28,47,48,49) the mask, in its repositionably alignable relation with respect to the indicia of the fingering pattern (21), comprises a string stop selector: a correlation of the zeroth (primary nut) string stop of the stringed fingerboard instrument with a string stop coordinate of the fingering pattern is specified by alignably positioning the mask and the fingering pattern with respect to each other. A mask is a member which serves the function of selecting a fingerboard pattern from a fingering pattern by substantially preventing the appearance of certain indications.

The apparatus of FIG. 4 also exemplifies a selector for selecting principal note names for a fingerboard pattern. The principal note name selected with this embodiment can be varied by repositioning the negative principal note series (41); the effect of this variation is to alter the tuning to a new congruent tuning. The principal note name selection will be exemplified at a fixed tuning by reference to FIG. 4, while the altering of congruent tuning will be discussed in reference to FIG. 7, below.

The negative principal note series (41) of FIG. 4 represents a chromatic ordering of note names ascending in the negative direction. The negative principal note series (41) is not in fixed positional relation to either the fingering pattern (21) or the string stop series (23). The spacings of the indicia of the negative principal note series (41) allow pairs of (fifth) indicia representing note names to substantially align with pairs of string stop coordinates of the fingering pattern (21) representing pairs of string stops separated by the same musical intervallic magnitudes as the respective pairs of note names.

The negative principal note reference (28) is in fixed positional relation to the string stop series (23) and aligns with indicia of the negative principal note series (41). The negative principal note reference and the negative principal note series need not be, but are allowed to be, in the same or in parallel planes. A principal note name is selected for a fingerboard pattern by bringing indicia of the negative principal note series (41) into alignment with the negative principal note reference (28); the thus-aligned (fifth) indicia indicate the selected principal note name, shown to be a G(52) in FIG. 4. Alignably repositioning the string stop series (23) and therewith the negative principal note reference (28) with respect to the fingering pattern, but holding the negative principal note series (41) and fingering pattern (21) immobile with respect to each other, brings other indicia of the negative principal note series into alignment with the negative principal note reference, and thus effects a change in the principal note name selection as well as a corresponding change in fingerboard pattern. (The tuning remains unchanged by this action.)

Referring to FIG. 4, the blues scale is indicated for the Five String Banjo to the principal note G(52) in a particular tuning. The identity of the particular tuning, although not indicated in FIG. 4, is obtained with the aid of the tuning references (43, 44) in a manner to be hereinafter further clarified.

If the musician desires to select a blues scale fingerboard pattern to a principal note other than G(52), remaining now in the same tuning, he has only to hold the fingering pattern (21) in fixed positional relation to the negative principal note series (41) while repositioning the string stop series (23) with respect to the negative principal note series (41) until the negative principal note reference (28) comes into alignment with the (fifth) indicia representing the desired principal note name, whereupon the desired principal note name has been selected.

According to terminology used herein, two stringed fingerboard instruments are said to be congruently tuned or tuned congruently to one another if all pairs of courses of one instrument are tuned to the same relative musical intervals as the respective pairs of courses of the other instrument, even though the respective individual courses of the two instruments may be tuned to different absolute pitches. Because there are twelve chromatic half-tones to an octave and because intervals of integral numbers of octaves are harmonically equivalent, any one tuning may be considered as representative of and included in a class of twelve congruent tunings.

A single fingering pattern may serve a plurality of congruently tuned instruments. The Twelve String Guitar, for instance, is commonly tuned congruently to the standard Guitar tuning but (typically) three chromatic halftones lower, thereby reducing the string tension forces on the instrument and prolonging its life. Standard Guitar tuning is E,A,D,G,B,E (giving the leftmost or lowest pitched string as leftmost in the ordering of tuning note names) so the Twelve String Guitar would be tuned congruently thereto when tuned as D flat, G flat, B, E, A flat, D flat.

Figure 7:
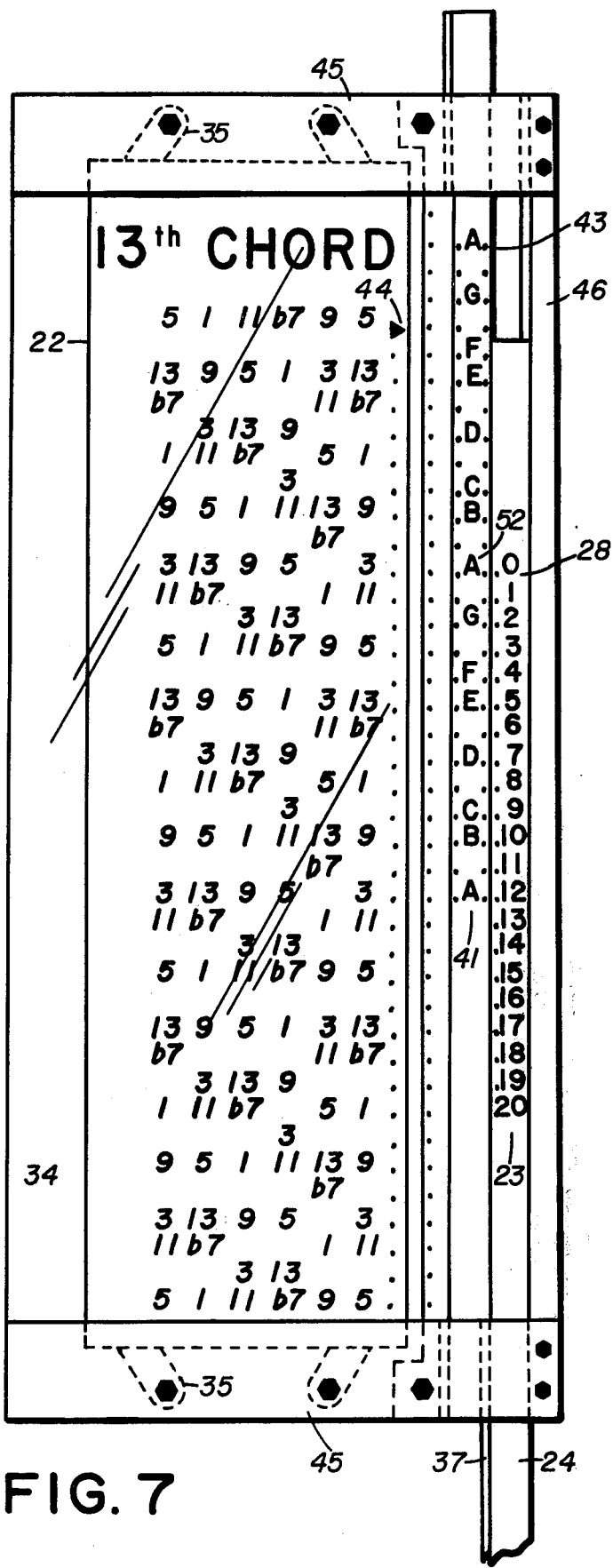
FIG. 7 is a plan view of the reverse side of the apparatus of FIG. 4, viewing a fingering pattern through substantially transparent material, indicating an A 13th chord fingerboard pattern in a tuning suitable for a Twelve String Guitar (Db,Gb,B,E,Ab,Db).

The use of a standard Guitar fingering pattern for a Twelve String Guitar will be further clarified by reference to FIG. 7. The apparatus of FIG. 4 is shown from the other (reverse) side in FIG. 7, which offers another view of structural pieces (46, 45, 34) which are held together by fasteners such as screws, rivets, or glue. The support member (34) is shown to be transparent through which the base (22) is viewed. Hexagonal nuts mate with screws which extend through to the other side. The negative principal note series (41) and the string stop series (23) have been permuted in position; however, their functions and manner of operation remain unaltered. The Banjo fingering pattern with its base has been replaced with a fingering pattern suitable for Guitar which is viewed through substantially transparent material (34) to which it has been affixed by fasteners such as clips (35, FIG. 4). The coordinates of the indicia of the fingering pattern (21) in FIG. 7 form a mapping image of allowable locations for fingering instruments tuned congruently to a given tuning, namely the standard Guitar tuning in this example, to sound tones of the thirteenth chord. The relationships of these tones to degrees of the major scale are symbolized by the respective indicia of the fingering pattern (21). (Scales other than the major scale can be similarily symbolized.)

The fingerboard pattern illustrated in FIG. 7 (including a fingering) pattern with selected string stop coordinates) may be used on either a standard Guitar or on a Twelve String Guitar, although the principal note name will differ in the two cases. The indicia of the negative principal note series which are in alignment with the negative principal note reference (28) indicate a principal note name, shown to be the note name A(52), for playing the A thirteenth chord on a Twelve String Guitar.

The notes of the congruent tuning are not indicated in FIG. 7; however an indication is given by which congruent tunings may be selected by selecting congruent changes in the given tuning. More particularly, the first tuning reference (43), shown to indicate a first note name A, is in fixed positional relation to the negative principal note series (41). The second tuning reference, shown to be an arrow mark (44), is in fixed positional relation to the fingering pattern and aligns with indicia of the negative principal note series (41) to select a second note name, shown to be the note name G flat or F#. The selection of the second note name is equivalent to the selection of a musical interval from the first note name to the second note name, A to G flat being three chromatic half-tones lower in pitch, the musical interval by which the given tuning, the standard tuning for Guitar in this example, is to be altered to arrive at the congruent tuning.

The congruent tuning is selected in accordance with the given tuning and the selected musical interval. On the Guitar, lowering the tuning congruently by three half-tones gives the Twelve String Guitar tuning; thus the congruent tuning which has been selected in FIG. 7 is the Twelve String Guitar tuning.

The principal note name is selected in this congruent tuning by alignment of indicia of the negative principal note series (52) with the negative principal note reference (28).

Thus, the selected principal note name, shown to be A(52), is for playing the Twelve String Guitar. To select a principal note name for the standard Guitar tuning for the same fingerboard pattern (holding the string stop series (23) in fixed positional relation to the fingering pattern (21)), the first (43) and second (44) tuning references would be brought into alignment with each other (thus selecting a musical interval of a unison) by repositioning the negative principal note series (41); a principal note name indication of note name C would then be selected by alignment with the negative principal note reference (28), and the fingerboard pattern would correspond to the C thirteenth chord on the Guitar.

Having selected the congruent tuning, the principal note name may be altered as heretofore taught, i.e., by holding the negative principal note series (41) and the fingering pattern (21) in fixed positional relation to one another while alignably repositioning the string stop series (23) (and with it, the negative principal note reference (28)) with respect to the fingering pattern.

The order of the steps of selecting the string stops and of selecting the principal note name is arbitrary, as long as a musically correct indication results. For instance, using the apparatus of FIG. 7, one might first align the string stop series (23) with the fingering pattern (21) and then align the negative principal note series (41) to achieve the resulting indication given in FIG. 7. Or, in a more likely sequence of steps, one could first align the negative principal note series (41) with the fingering pattern from a knowledge of the desired tuning, namely three chromatic half-tones below standard Guitar tuning, and then align the string stop series (23) according to the desired principal note to give the same resulting congruent tuning, principal note and fingerboard pattern.

Principal note names are also selected by an apparatus comprising a fingering pattern and a principal note series, these two members being illustrated in FIG. 7, but not including a string stop series. The congruent tuning is selected in the manner previously exemplified by FIG. 7. The indicia representing the desired principal note name are selected from the principal note series by inspection. The string stop coordinate of the fingering pattern in alignment with the selected principal note indicia is correlated with a particular string stop of the stringed fingerboard instrument, such as the zeroth string stop in the example of FIG. 7. In this manner, a string stop selection is made. Thereafter, the musician makes use of that portion of the fingering pattern which represents zero or positive string stop numbers for selecting congruent tunings and principal note names. Referring to FIG. 7, an example can be described for the Twelve String Guitar tuning and the principal note name A. The desired congruent tuning is achieved by an alteration of the given tuning (standard tuning for Guitar) by three half-tones, as previously taught using the tuning references (43, 44). The desired principal note name is selected from the principal note series (41) by inspection and a string stop selection is implied thereby. In the example of FIG. 7, selecting the principal note name, say A, implies a string stop selection by which the zeroth string stop correlates with the string stop coordinate which is in alignment with the indicium of the principal note series (41) which indicates the selected principal note name (A); a fingerboard pattern is thereby selected. Taking a detailed example, the indicium in the rightmost course coordinate (column) of the fingering pattern (21), shown as a three, is in alignment with an A indicium of the principal note series (41) (there are two such A indicia (41) and either may be used); this indicium three represents the third degree of the major scale. The tone which is sounded by the open strings (played at the zeroth string stop) of the first course of the Twelve String Guitar is in fact the third degree of the A major scale. Thus, the selected fingerboard pattern agrees with the tones produced by the instrument. Successive stops are found below this string stop coordinate; above this indicium three, the locations of the fingering pattern do not uniquely correspond to specific features of the fingerboard of the instrument for this congruent tuning and principal note name.

The apparatus shown by FIGS. 4 and 7 exemplifies a broad method by which chord or scale information can be selected for a plurality of congruently tuned musical instruments from a single fingering pattern in cooperation with a string stop selector and a selector for selecting a principal note name consistent with the desired congruent tuning. In this method, if the principal note name of a fingerboard pattern being indicated to the principal note A is altered such that the fingerboard pattern remains the same for all string stop numbers and course numbers but the principal note is now selected as the note B, then a new indication comprising principal note name indication and fingerboard pattern indication corresponds to a change in congruent tuning of the instrument where all strings are now tuned two chromatic half-tones higher than before (for B is two half-tones higher than A).

An important utility of the instant method and apparatus is therefore evident: the use of the instant method and apparatus enables a fingerboard pattern which is valid for a given tuning to be made applicable to all twelve tunings congruent to the given tuning. Stated another way, by practice of this method, a fingerboard pattern which is valid for one given stringed fingerboard instrument may be used for other instruments tuned congruently thereto. As a consequence, for example, the same fingerboard pattern as is used for Mandolin can be used for Tenor Banjo, Violin, Violoncello and Mandolin Cello, since all of these instruments are congruently tuned in their four courses.

There are other ways in which fingering patterns and fingerboard patterns may apply to a plurality of stringed fingerboard instruments. For example, the four strings of the Baritone Ukelele are tuned the same as the four highest pitched strings of a Guitar in standard tuning, and therefore the Baritone Ukelele can make use of fingerboard patterns for standard Guitar tuning. Also, chord and scale fingering patterns may indicate more courses than a single stringed fingerboard instrument possesses, as in FIG. 4, above, where several different Five String Banjos use the same fingering pattern. More dramatic alterations in tuning are accommodated by the apparatus of FIG. 8.

Figure 8:
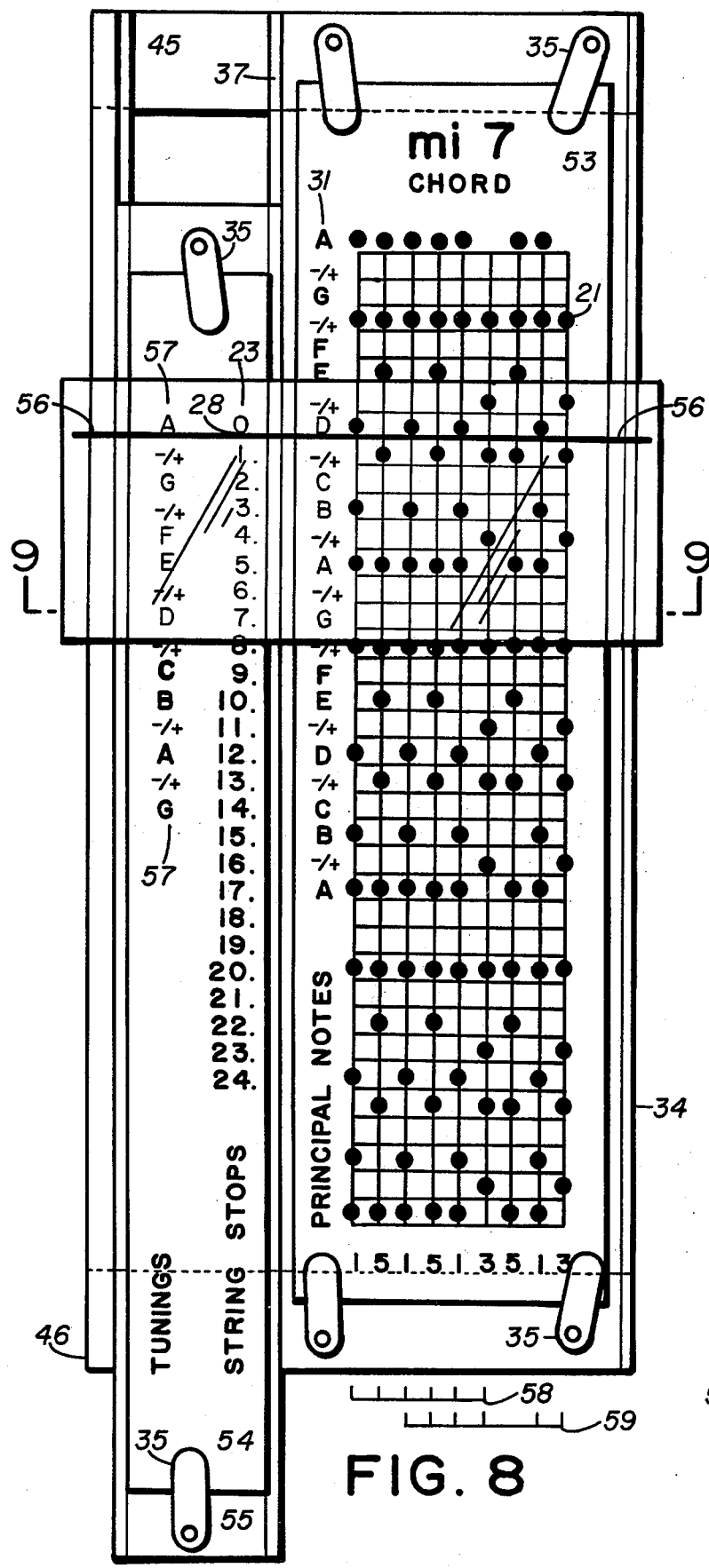
FIG. 8 is a plan view of an apparatus comprising a fingering pattern for open major tunings, a negative principal note series, a string stop series, and a negative tuning reference series, the apparatus being useful for the playing of minor seventh chords on a variety of stringed fingerboard instruments.

The embodiment of FIG. 8 further extends the art of indicating a plurality of tunings for a plurality of instruments. As illustrated, the apparatus of FIG. 8 presents an indication which represents a composite of several individual, nonstandard major tunings which are in contemporary use by musicians of the Guitar, Banjo, and other instruments. (The fifth string of Five String Banjos is not intended to be represented in FIG. 8.) A major tuning is a tuning in which the open courses of the stringed fingerboard instrument are tuned to sound tones of the major chord.

According to the apparatus of FIG. 8, a fingering pattern (21) on a base (53) represents allowable locations to sound tones of the minor seventh chord. The base (53) is interchangeably affixed to a support member (34) by fasteners such as clips (35). A string stop series (23) is on a base (54) which is interchangeably affixed to a support member (55) by fasteners such as clips (35). The support member (34) is provided with a tongue (37) along one edge which receives a groove in the support member (55) for relative movement between the fingering pattern (21) affixed to the support member (34) and the string stop series (23) affixed to the support member (55). The fingering pattern (21) and the string stop series (28) are alignably repositionable with respect to each other to select a fingerboard pattern in the manner heretofore taught; they are substantially adjacent to one another, but need not be in the same or in parallel planes. A tongued sleeve piece (46), which receives another groove along the support member (55), is held fast to crosspieces (45) at either end, which in turn are held fast to the support member (34). A selector for selecting principal note names and congruent tunings comprises a negative principal note series (31) of fourth indicia shown to be on the base (53), and a series of sixth indicia, hereinafter referred to as tuning reference series, shown to be on the base (54). This particular tuning reference series is shown to be a negatively directed series of note name indicia, and is therefore referred to as negative tuning reference series (57). The various patterns and series need not be in the same or in parallel planes. Support members are substantially transparent to allow two-sided operation. A slidable, substantially transparent window with a cursor line (56) aids in reading indicia which are in alignment.

Figure 9:
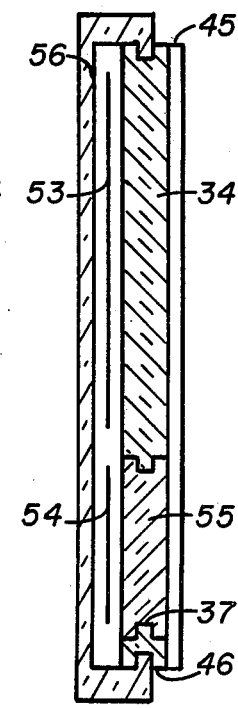
FIG. 9 is a sectional view of the apparatus of FIG. 8, looking in the direction 9—9.

An end view of the apparatus of FIG. 8 may be seen in FIG. 9 (where the fasteners (35) have been omitted for clarity). The transparent window with cursor (56) slides in grooves in the edges of the support member (34) and the sleeve piece (46). The crosspiece (45) is fastened to the support member (34) and to the sleeve piece (46) by suitable means such as glue. The bases (53,54) are illustrated schematically as being between the respective support members (34,55) and the cursor (56).

The fingering pattern of FIG. 8 represents a composite of several related major tunings, the individual tunings overlapping each other from left to right. As with the example of FIG. 4, the desired course coordinates are selected by inspection. The musician is not constrained to select only contiguous course coordinates (58), but may also use non-contiguous course coordinates (59) of the fingering pattern (21). The selection process is aided by an indication of the major scale degree to which the respective course is tuned, shown below the fingering pattern (21) as 1, 3, and 5 indicia symbolizing degrees for major tunings.

A single fingering pattern can be made for a pair of individual tunings for which a group (greater than one) of contiguously strung courses in one tuning is tuned congruently (but not necessarily identically) to the same number of contiguously strung courses in the other tuning, such that any remaining courses in the first tuning are all to the left of the group and such that any remaining courses in the second tuning are all to the right of the group. The single composite fingering pattern is made with course coordinates for the group of congruently tuned courses and with course coordinates for the remaining courses on either respective side of the group. Several repetitions of this grouping process with several major tunings yields the fingering pattern of nine course coordinates shown in FIG. 8. Some of the contemporary tunings contained in the fingering pattern of FIG. 8 are: for the four long strings of the Five String Banjo, the G, D, and C major tunings; for the Guitar, the E and A major tunings.

One great value of this method of displaying multiple tunings is the simplicity and ease with which information for any of the individual tunings can be accessed. In addition, the tunings congruent to the individual tunings are also readily available for display. The fingering pattern in FIG. 8 affords forty-eight tunings to be indicated for the Guitar, if only contiguous course coordinates (58) are used. (There are four sets of six contiguous course coordinates and twelve congruent tunings for each set, 4×12 equals 48.) Further Guitar tunings are afforded by using non-contiguous course coordinates (59). For tunings for the Banjo, which has fewer courses, a greater number of contiguous course coordinates can be chosen from the nine available.

Individual chord and scale fingering patterns made in this novel manner indicate the unifying similarities of a broad class of tunings, such as major tunings, minor tunings, or modal (suspended fourth) tunings.

By way of further description of the elements and operation of the apparatus of FIG. 8, the negative principal note series (31), and the fingering pattern (21) are in fixed positional relation to one another, although they need not be on the same base or in the same or in parallel planes. Spacings of the indicia of the negative principal note series (31) allow pairs of (fourth) indicia representing note names to align with pairs of indicia of the string stop series (23) representing pairs of string stops separated by the same musical intervallic magnitudes as the respective pairs of note names. Indicia of the tuning reference series (57) function as negative principal note references, as is further described below.

The negative tuning reference series (57) of FIG. 8 may be also referred to as a tuning reference pattern, which here comprises only one tuning reference series. The negative tuning reference series (57) and the negative principal note series (31) are in repositionable relation to one another. However, the negative tuning reference series (57) is in fixed positional relation to the string stop series (23). The negative tuning reference series (57) is used in selecting the congruent tuning and in selecting the principal note name in the selected congruent tuning.

An example of the operation of the negative tuning reference series (57) will aid in understanding the further description of the structure and operation of the apparatus in FIG. 8. The indicium of the negative tuning reference series (57) which is on the cursor line (56) and shown to be an A signifies the A major tuning, while the therewith aligned indicium of the negative principal note series (31) shown to be a D, also on the cursor line (56), signifies the D minor 7th chord. Thus, the chord to which the illustrated fingerboard pattern relates, on an instrument tuned to the A major tuning, is the D minor 7th chord. Still using the same fingerboard pattern, in the G major tuning (find the indicium G in the negative tuning reference series (57)), the principal note name for the minor seventh chord is C (find the indicium C in the negative principal note series (31), which aligns with the G of (57)). With the goal of the discussion in view, the structure can now be more completely described.

Further clarifying the spaces of the negative tuning reference series (57), pairs of indicia of the negative tuning reference series may be taken to represent two termini which define a musical interval. The spacings of the indicia of the negative tuning reference series (57) and of the negative principal note series (31) are of such sizes that repositioning the negative tuning reference series (57) and the negative principal note series(31) with respect to each other in substantially the vertical direction brings pairs of indicia of the negative tuning reference series (57) representing a particular musical interval into alignment with pairs of indicia of the negative principal note series (31) representing names of notes separated by the same musical interval.

The negative tuning reference series (57) and the string stop series (23) are in fixed positional relation to one another such that indicia of the negative tuning reference series (57) and indicia of the negative principal note series (31) substantially align while indicia of the string stop series (23) and indicia of the fingering pattern (21) substantially align.

The desired congruent tuning is related to a given tuning by a selected musical interval, hereinafter referred to as transposition interval. The given tuning for the nine courses represented by FIG. 8 is an A major tuning, A,E,A,E,A,C#,E,A,C#, in order from left or bass, to right or treble. Tunings are transposed by adding the same musical interval to each of the courses. Thus, in selecting the transposition interval the congruent tuning is also selected.

The manner of selecting the transposition interval will now be considered. Musical intervals are determined by two termini. One of the termini of the transposition interval is a given terminus, taken in FIG. 8 to be the indicium of the tuning reference series (57) shown to be an A indicium which is on the cursor line (56). The remaining terminus is indicated by selected indicia of the tuning reference series (57). To select the given tuning, the remaining terminus is selected to be in unison with the given terminus, the A indicium; thus, selecting the A indicium of the tuning reference series also selects back the given tuning of A major. Such a selected terminus is referred to hereinafter as selected tuning reference. To select a congruent tuning lowered by two half-tones from the given tuning, the remaining terminus is to be selected as the G indicium, for the musical interval from A to G is two half-tones lower. Reselecting different tuning reference indicia corresponds to altering the congruent tuning of the stringed fingerboard instrument(s).

The principal note name selection is indicated by indicia of the negative principal note series (31) which align with the selected tuning reference. Alignably repositioning the same selected tuning reference with respect to the negative principal note series (31) reselects the principal note name and adjusts the fingerboard pattern accordingly, while holding the congruent tuning constant.

The steps of selecting a fingerboard pattern, selecting a principal note name and selecting a congruent tuning may be carried out in any order to achieve the same end result.

It is possible to so configure the apparatus as to make the string stop series (23) further usable as a tuning reference series, for both series effectively indicate termini of musical intervals. By way of example, using the fingerboard pattern indicated in FIG. 8 which is selected by the cooperation of the fingering pattern (21) and the string stop series (23): the principal note name of the minor 7th chord in the given tuning is D (the indicium zero of the string stop series (23) aligns with a D indicium of the negative principal note series (31); the principal note name in a congruent tuning two chromatic halftones lower than the given tuning is C (the indicium two of the string stop series (23) aligns with the indicium C (31)). The negative tuning reference series shown in FIG. 8, however, is decidely easier to use, for it further indicates the principal note name of the major tuning (not of the minor seventh chord).

In review of FIG. 8, a fingerboard pattern is indicated for playing the minor seventh chord in a plurality of major tunings and to the respective principal note names in those tunings on Guitars and Banjos. The congruent tuning and the principal note name are selected by use of the tuning reference series (57) and the negative principal note series (31). The indicated fingerboard pattern is indicated to pertain, for example, to the D minor 7th chord in several A major tunings and the A minor chord in several E major tunings.

The apparatus of FIG. 8 is well suited for the indicating of chord and scale fingerboard patterns in a variety of congruent tunings. Changes in principal note names in any of the twelve congruent tunings are easily executed and are displayed in a convenient and readable manner.

Figure 10:
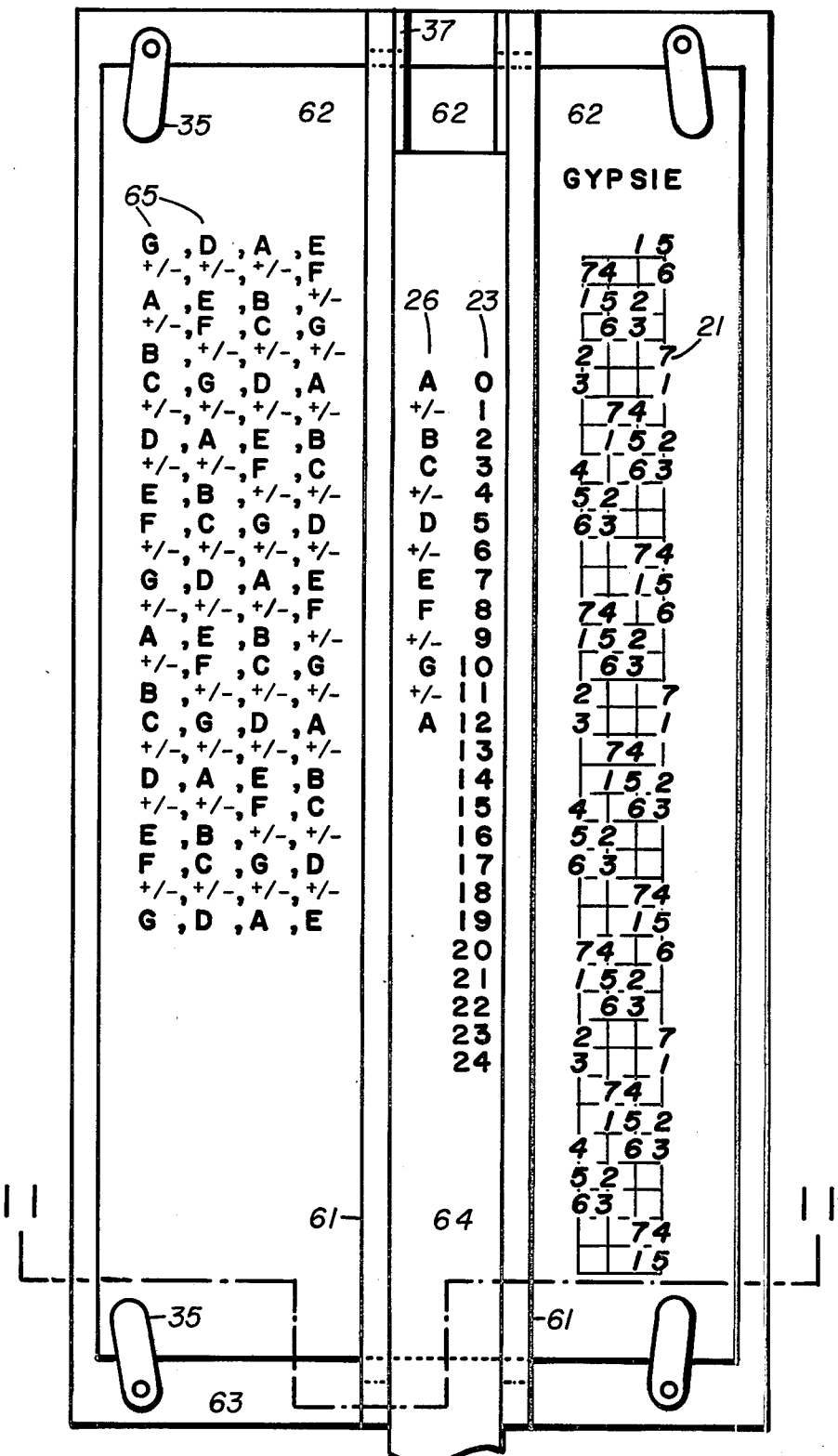
FIG. 10 is a plan view of an apparatus comprising a fingering pattern of scale degrees of the gypsie scale, a string stop series, a positive principal note series, and a negative tuning reference pattern, the apparatus being useful for playing the Violin, Mandolin, Violoncello, and other instruments tuned in fifths.

It is advantageous to further indicate the complete set of note names in the congruent tuning, a function provided by the apparatus of FIG. 10.

Examining the example of FIG. 10, a fingering pattern (21) on a base (62) represents allowable locations for sounding scale degrees of the gypsie scale on a stringed fingerboard instrument which is tuned congruently to a Violin. The indicia of the fingering pattern indicate scale degrees of the gypsie scale. The base (62) is interchangeably affixed to a support member (63) by fasteners such as clips (35). Sleeve pieces (61) affixed to the top of the support member (63) have longitudinal openings (indicated in FIG. 11 but not viewable in FIG. 10) through which the base (62) is allowed to pass from left to right. The sleeve pieces (61) are provided with tongues which are received by grooves along the edges of a base (64) which is thereby held above the base (62) for relative movement between the fingering pattern (21) and the base (62) and a string stop series (23) which is on the base (64). A fingerboard pattern is selected in the aforementioned way by bringing the string stop series (23) and the fingering pattern (21) into alignment with respect to one another. A selector for selecting principal note names and congruent tunings comprises a positive principal note series (26) of third indicia on the base (64) and a tuning reference pattern (65) of sixth indicia, which here are positively directed and on the base (62).

Figure 11:
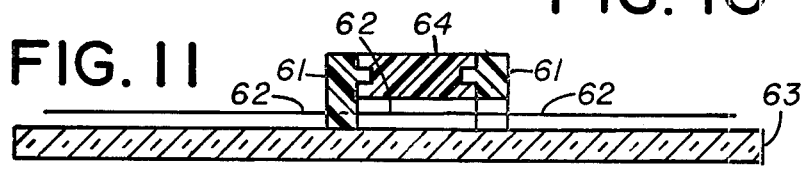
FIG. 11 is a sectional view of the apparatus of FIG. 10, looking in the direction 11—11.

A cross section of the apparatus of FIG. 10, taken along the cut 11—11, is shown in FIG. 11. The base (62) is shown to extend always over the support member (63), beginning on the right and proceeding to the left, continuing through a slot running nearly the length of the right sleeve piece (61), under the base (62), through the slot in the left sleeve piece (61), and further out over the support member (63) on the left.

The direction of increasing note name in tuning reference patterns is necessarily the same as the direction of the increasing note name of the principal note series. The tuning reference pattern of FIG. 10 is hereinafter referred to as positive tuning reference pattern (65), in order to distinguish the pattern (65) from other species of tuning reference patterns such as the negative tuning reference series (57) of FIG. 8. The fingering pattern (21) and the positive tuning reference pattern (65) are in fixed positional relation to one another on the base (62). Patterns may be printed onto various bases and interchanged with other patterns by removing the base and replacing it with a new base bearing other patterns. The string stop series (23) and the positive principal note series (26) are in fixed positional relation to one another and on the base (64), which is in slidable positional relation to the other base (62). The various patterns and series need not be in the same or in parallel planes.

The positive tuning reference pattern (65) indicates the names of the notes in congruent tunings which pertain to allowable tunings of the courses represented by the course coordinates of the fingering pattern (21). The positive tuning reference pattern (65) has a first dimension (shown to be the horizontal or X dimension) along which ordinal positioning of the (sixth) indicia represents courses of the stringed fingerboard instrument and a second dimension (shown to be the vertical or Y dimension) along which coordinates have spacings to be further described. The indicia representing tuning note names for any particular course are shown to be ordinally positioned in a plurality of tuning reference series, which in the instant embodiment are positively directed.

The vertical spacings of indicia of the positive tuning reference pattern allow pairs of indicia of this pattern representing tuning note names to align with pairs of indicia of the positive principal note series representing principal note names separated by the same musical interval as the respective pairs of tuning note names. The direction of increasing note name of the positive tuning reference pattern is necessarily the same as the direction of increasing note name of the positive principal note series. Notice FIG. 8, where the single tuning reference series and principal note series are both negatively directed. Thus, the apparatuses of FIGS. 8 and 10 differ in the number, direction, and position of tuning reference series, as well as in the completeness with which the congruent tuning is indicated. The individual tuning reference series of FIG. 10 may be operated to indicate transposition intervals in similar fashion to the single tuning reference series of FIG. 8 (the tuning in FIG. 10, however, is not a major tuning). The indicia of the plurality of tuning reference series in the positive tuning reference pattern of FIG. 10 further indicate the tuning note names in the selected congruent tuning.

In operating the apparatus of FIG. 10, the fingerboard pattern is selected in the manner heretofore taught. The congruent tuning is selected by inspection, wherein the indicia of the tuning reference pattern (65) indicate the congruent tuning and serve as tuning reference. Indicia of the positive principal note series (26) which are in alignment with the tuning reference indicate the principal note name for the fingerboard pattern in the respective congruent tuning, whereupon the principal note name has been selected. The ordering of the steps of selecting fingerboard pattern, principal note name, and congruent tuning is immaterial with this apparatus.

The embodiment in FIG. 10 is shown to indicate a fingerboard pattern which the musicians of various congruently tuned stringed fingerboard instruments may use to play scale degrees of the gypsie scale. The principal note name varies with the congruent tuning, as indicated: E for Violin or Mandolin (tuning G,D,A,E); C♯ in the tuning E,B,F♯, C♯; B in the tuning D,A,E,B; and A for the Violincello (tuning C,G,D,A).

The pattern of note names of tones sounded by the stringed fingerboard instrument, hereinafter referred to as fingerboard note pattern, has not been explicitly indicated by the fingerboard patterns of the previous examples. A fingerboard note pattern (a type of pattern of musical invariants) is selected by use of a note name pattern in cooperation with a string stop selector. A note name pattern is a two dimensional pattern of note name indicia; string stop coordinates and course coordinates specify the locations of the note name indicia in the pattern. Going from the fingerboard of the instrument to the note name pattern of an apparatus, a mapping is followed according to which ordinal numbers of the string stops and ordinal numbers of the courses, at which the stringed fingerboard instrument may be fingered to sound respective tones with particular note names, are mapped into the string stop coordinates and course coordinates of note name indicia of the note name pattern. The note name indicia indicate the note names of the respective tones. The positive tuning reference pattern (65) of FIG. 10 serves as an example of a note name pattern. The string stop selector of FIG. 10 comprises a string stop series (23) (this selector operates with a positively directed note name pattern).

Thus, FIG. 10 is used as an example of the selection of fingerboard note patterns. For this function, the positive principal note series (26) and the fingering pattern (21) of FIG. 10 are to be ignored, i.e., they are not needed. The indicium zero of the string stop series (23) representing the zeroth string stop is brought into alignment with the indicia of the note name pattern (the positive tuning reference pattern (65)) indicating the desired congruent tuning; a correlation is thereby established correlating a specific string stop coordinate of the note name pattern with a specific string stop of the stringed fingerboard instrument. A note name pattern for which such a correlation has been established is a fingerboard note pattern. The note names obtained at the zeroth string stop of the stringed fingerboard instrument are indicated by the note name indicia in alignment with the indicium zero of of the string stop series (23). Similarly, the note name indicia of the tuning reference pattern (65) which are in alignment with the indicium two of the string stop series (23) indicate the note names available at the second stop on the fingerboard of the stringed instrument, and so forth.

According to the drawing in FIG. 10, the fingerboard note pattern has been selected for Tenor Banjo and Violoncello, both of which are tuned C,G,D,A. To select a fingerboard note pattern for Violin, the indicium zero of the string stop series (23) is to be aligned with the indicia of the positive reference pattern (65) which indicate the proper tuning G,D,A,E. In this manner, the patterns of note names of the fingerboards of a plurality of congruently tuned stringed instruments is economically and conveniently given.

Many of the above embodiments have provision for interchanging various patterns. For instance, for the embodiments in FIGS. 4,7,8, and others, interchangable patterns and series may be economically produced on any of a variety of materials, using well-known graphic and manufacturing techniques and processes. Therefore, positive tuning reference patterns can be used therewith for the selection of fingerboard note patterns, i.e., by replacing a fingering pattern with a note name pattern.

For certain instruments having variant string stops, it is also advantageous to interchange string stop series. For example, the fretted dulcimer has several frets missing from the chromatic ordering, having an ordering and a chromatic spacing which corresponds to the major scale with a lowered seventh degree. The dulcimer string stop series is operated in the usual manner; string stop coordinates of the fingering pattern which do not align with indicia of the string stop series are to be ignored in the fingerboard pattern.

Figure 12:
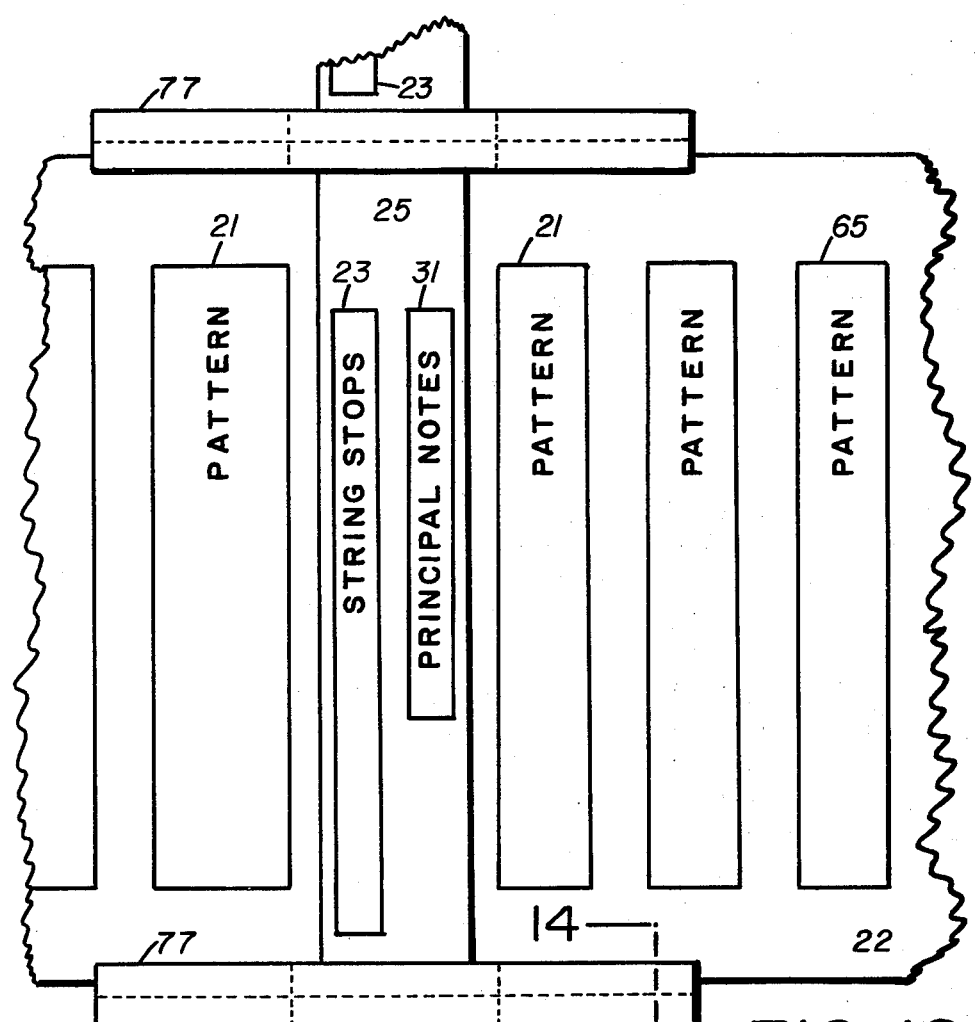
FIG. 12 is a schematic plan view of an apparatus with slidably alignable and interchangeable patterns (fingering patterns and tuning reference patterns), string stop series and principal note series.

The apparatus of FIG. 10 is similar to the apparatus of FIG. 12, for both have a plurality of repositionable patterns (21,65) on a base and a plurality of series (23,26) on a base. The apparatus of FIG. 12 stores a plurality of interchangeable patterns and series which cooperate to indicate fingerboard patterns, principal notes and tunings as heretofore discussed.

Figure 13:
FIG. 13 is a sectional view corresponding to FIG. 12, looking in the direction 13—13.
Figure 14:
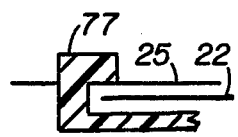
FIG. 14 is a sectional view of the apparatus of FIG. 12, looking in the direction 14—14.

According to the embodiment of FIG. 12, a sleeve piece (77) shaped like a long shallow U has grooves in the arms (seen in FIG. 14) of the U to receive a base (22) which is schematically shown to be bearing patterns of indicia (fingering patterns (21) or tuning reference patterns (65)). The patterns are stored on the base (22) and are retrieved by lateral motion. The arms of the sleeve piece (77) are provided also with slots (76) (seen in FIG. 13) through which a base (25) is enabled to pass above the base (22), thereby allowing relative movement and alignment between the patterns on the base (22) and the series (string stop series (23) and principal note series (31)) which are on the base (25). The series are shown to be stored on the base (25) and are retrieved by vertical motion. To select a fingerboard pattern, the desired fingering pattern (21) is repositionably brought laterally to a position substantially adjacent to the string stop series (23). The string stop series is substantially vertically repositionable and aligns with the fingering pattern to select a fingerboard pattern in the manner previously taught. Principal note series (31) and tuning reference patterns (65) alignably and repositionably cooperate to select principal note names and congruent tunings in the fashion heretofore exemplified in other illustrations. Additional aids are incorporable (not illustrated), such as storing and positioning series and patterns of indicia on flexible strip bases by means of take-up and supply spools mounted to a supporting member.

In several of the above embodiments, various indicia may be placed in locations other than at those illustrated in the figures, provided that corresponding changes are made to the locations of other series and patterns aligning therewith. Such variations, being equivalent functionally and easily derived from elementary music theory together with the already disclosed teaching, will not be further treated here.

All of the above embodiments utilize patterns of indicia. An apparatus which generates such patterns is therefore useful. The apparatus of FIG. 15 illustrates a manner of generating patterns, with particular application to fingering patterns but also with application to tuning reference patterns.

Fingering patterns for a particular chord or scale for fingerboard instruments with a plurality of courses can be composed in a manner to be set forth with reference to FIG. 15, wherein a selector for selecting patterns comprises a plurality of individual series of seventh indicia, hereinafter referred to as fingering series (68), on bases (71). Each such series represents at least one course for the particular chord or scale, as illustrated in FIG. 15 where fingering series (68) represent individual courses. To broaden out the discussion of composed fingering patterns, selectors are provided for selecting string stops, congruent tunings and principal note names. The string stop selector comprises a string stop series (23) of (second) indicia on a base (24). The congruent tuning and principal note name selector comprises a negative principal note series (41) of (fifth) indicia on a base (42), a principal note reference shown as an indicium zero (28) of the string stop series (23), a tuning reference mark shown as a T on the base (42), and a plurality of positively directed tuning reference series (72) on the bases (71).

FIG. 16 is an end view of the apparatus of FIG. 15, showing the bases (42,24,71) and a sleeve piece (70). The fingering series (68) of FIG. 15 may be thought of as portions of a fingering pattern obtained by cutting between the several course coordinates of a fingering pattern, for instance that of FIG. 4, to allow individual vertical series of (first) indicia to be vertically repositioned with respect to one another. The fingering series do not indicate note names.

Each of the fingering series (68) is shown to be in fixed positional relation to a positive tuning reference series (72), indicating note names. The spacings of indicia of the positive tuning reference series allow pairs of indicia representing tuning note names to align with pairs of string stop coordinates of a (separate) fingering series (68) representing pairs of string stops separated by the same musical intervallic magnitudes as the respective pairs of tuning note names.

A fingering pattern is composed by the fingering series (68) when the string stop coordinates of the various fingering series (68) are brought into alignment with one another, as shown in FIG. 15, by substantially vertical motion of the various fingering series. The various positive tuning reference series are also thereby brought into alignment to compose a positive tuning reference pattern, as also shown in FIG. 15.

The string stop series (23) cooperates with the resultant fingering pattern to select a fingerboard pattern in the manner heretofore taught. Further, the string stop series (23) cooperates with the positive tuning reference pattern (serving as a note name pattern) to select a fingerboard note pattern in the manner already disclosed (not illustrated in FIG. 15).

The principal note name is selected by aligning the indicium of the negative principal note series (41) indicating the desired principal note with the principal note reference, shown to be the indicium zero of the string stop series (23). The congruent tuning for the fingerboard pattern is selected by aligning the tuning reference mark T with indicia of the tuning reference pattern which indicate the desired congruent tuning.

Noncongruent tunings are selected by bringing the positive tuning reference series into alignment with one another by virtue of substantially vertical motion to indicate the desired tuning, whereby a fingering pattern is also composed by the fingering series (68). Tunings congruent to the thus selected tuning are selected in the manner heretofore taught.

Interchangeability of series and multiple series storage techniques, previously discussed, can also be applied to the composition of fingering patterns, note name patterns and tuning reference patterns.

The illustration of FIG. 15 indicates a composed fingerboard pattern for playing the G blues scale on the four long strings of a Five String Banjo tuned as D,G,B,D (as in FIG. 4).

As used herein, indicia may be any marks, symbols, characters, letters, or numbers. For example, indicia of fingering patterns (21) are shown as marks (FIG. 1), numbers (FIG. 10), letters (FIG. 3), and other symbols (FIG. 4). As used herein, the terms indicia, symbol, indicating means, and the like, include the application of techniques for conveying information such as contrasting colors, contrasting shadings of light and dark, raised and lowered topographical features, variations in light reflection, variations in light emission, passive techniques such as printed indicia on a suitable base, and techniques which actively utilize energization, whether electrically, optically, magnetically, electromagnetically, or otherwise energized, with suitable substrate or base. Passive indicating techniques generally involve indicia which are in fixed positional relation to a particular local base, whereas actively energized indicating techniques exist which involve indicia that are not constrained to be in a fixed positional relation to a particular substrate or base. For example, printed indicia on a base are immobile with respect to the base, but indicia which are actively written by a signal generator on a cathode-ray-tube phosphor base may be moved with respect to the phosphor base. Patterns and series of indicia which are actively indicated are considered to be on the same base if they are simultaneously indicated in superposition. The terms "align," "alignment," etc., are not restricted to linear alignment characterized by right angles of 90°.

A given stringed fingerboard instrument is capable of being tuned in many ways, and some tunings are congruent, as heretofore defined; for these tunings the instant method and apparatus enables the indication of chord or scale fingerboard patterns of a plurality of congruent tunings from a single fingering pattern. Other non-congruent tunings can be totally different from each other, each requiring its own fingering pattern; even so, the composition of fingering patterns from a plurality of fingering series and the interchangeability of fingering patterns are features of the apparatus which bring it into broad application here, also. Between these two extremes, there are tunings which are partially congruent, that is, congruent in some but not all courses, and which resemble each other sufficiently that they can, by an application of the instant method and apparatus, be indicated from a single fingering pattern (as in FIG. 8), thus allowing a great reduction in the number of fingering patterns needed to display the information. Furthermore, in any tuning the instant method and apparatus admit to fingerboard pattern indications for chords and scales to a plurality of principal notes.

Obviously numerous modifications and variations of the present invention are possible in the light of the above teachings. It is therefore to be understood that within the scope of the appended claims the invention may be practiced otherwise than as specifically described therein.

I claim:

1. An apparatus for indicating finger pattern information for a musical stringed fingerboard instrument, comprising:

a first base; at least one type of fist indicia on said first base in a fingering pattern specified by pairs of coordinates having first dimension course coordinates representing courses of said stringed fingerboard instrument and second dimension string stop coordinates representing string stops characteristic of musical intervals used in fingering said stringed fingerboard instrument, the direction of increasing said string stop coordinates representing the direction of increasing musical pitch on the stringed fingerboard instrument, said pairs of coordinates forming a mapping image of allowable locations for fingering said stringed fingerboard instrument to sound musical tones of a chord or scale; a tuning reference being present on said first base;

a second base; a string stop series of second indicia on said second base, said second indicia representing an ordinal numbering of string stops of said stringed fingerboard instrument, said ordinal numbering ascending in the same directional sense as the direction of increasing said string stop coordinates of said fingering series, said second indicia having spacings which represent musical intervallic magnitudes characteristically used in stopping the strings of said stringed fingerboard instrument and which are of such size that pairs of indicia of said string stop series align with pairs of string stop coordinates of said fingering pattern, said aligned pairs of string stop coordinates representing the same musical intervallic magnitudes as said spacings of said second indicia thereto aligned, said string stop series being substantially adjacent to said fingering pattern along said second dimension of said fingering pattern, said string stop series and said fingering pattern being alignably repositionable with respect to each other in a direction substantially along said second dimension of said fingering pattern; a principal note reference being present on said second base; and a third base; a negative principal note series of third indicia being on said third base and being substantially adjacent to said string stop series and said fingering pattern and being repositionable with respect to said string stop series and with respect to said fingering pattern in a direction substantially along said second dimension of said fingering pattern and representing a chromatic ordering of note names descending in musical pitch in the same directional sense as the direction of increasing musical pitch as represented by said string stop coordinates of said fingering pattern, pairs of said third indicia having such spacings as to be alignable with pairs of string stop coordinates of said fingering pattern representing the same musical intervallic magnitudes as characterized by said note names represented in turn by said third indicia so aligned;

whereby a fingerboard pattern may be indicated for the desired principal note in any one of a plurality of congruent tunings.

2. The apparatus of claim 1 wherein:

the symbols indicated by indicia of said fingering pattern are members of a set of symbols including certain symbols which symbolize the relationships between scale degrees of a musical scale and respective said tones sounded by fingering said stringed fingerboard instrument at allowable locations represented by said pairs of coordinates of said respective indicia of said fingering pattern, whereby said fingering pattern indicates not only a mapping image of allowable locations for fingering the stringed fingerboard instrument to sound tones of a chord or scale but also the respective natural or modified scale degrees so obtained, whereby the musician may choose tones according to their function in the scale.

3. The apparatus of claim 2, wherein:

said bases of said fingering pattern, of said string stop series, and of said negative principal note series are in slidable relationship to one another in a direction substantially along said second dimension of said fingering pattern; and further comprising:

means for holding said bases of said fingering pattern, of said string stop series, and of said negative principal note series substantially ajdacent to one another;

whereby said fingering pattern and series are held in proximity to one another while allowing repositioning and alignment.

4. The apparatus of claim 1, further comprising:

means for interchanging said fingering patternswith at least one other fingering pattern, whereby the interchanging of various patterns to provide variety, such as for different chords, scales, instruments, tunings, and types of symbols is facilitated.

5. The apparatus of claim 4, further comprising:

means for interchanging said string stop series with at least one other string stop series whereby various string stop series are used for various instruments.

6. The apparatus of claim 1, wherein said tuning reference is an indicium other than said first indicia.

* * * * *